United States Patent [19]

Nakayama et al.

[11] 3,852,156

[45] Dec. 3, 1974

[54] PROCESS FOR THE PREPARATION OF 6-AZAURACIL RIBOTIDE

[75] Inventors: Kiyoshi Nakayama, Sagamihara; Haruo Tanaka, Machida, both of Japan

[73] Assignee: Kyowa Hakko Kogyo Co., Ltd., Tokyo, Japan

[22] Filed: Apr. 18, 1973

[21] Appl. No.: 352,349

Related U.S. Application Data

[63] Continuation-in-part of Ser. No. 737,375, June 17, 1968, abandoned, which is a continuation of Ser. No. 671,561, Sept. 29, 1967, abandoned.

[30] Foreign Application Priority Data
Oct. 6, 1966    Japan................................ 41-65428

[52] U.S. Cl............................................. 195/28 N
[51] Int. Cl............................................. C12d 13/06
[58] Field of Search................................... 195/28 N

[56] References Cited
FOREIGN PATENTS OR APPLICATIONS
827,441   2/1960   Great Britain................... 195/28 N

OTHER PUBLICATIONS

Skoda et al., Experimentia, Vol. XIII pages 150 and 151, (1957).

*Primary Examiner*—Alvin E. Tanenholtz
*Attorney, Agent, or Firm*—Craig & Antonelli

[57] ABSTRACT

A process for the preparation of 6-azauracil ribotide by fermentation which comprises culturing a microorganism belonging to the genus Brevibacterium, Corynebacterium, Arthrobacter or Micrococcus under aerobic conditions in an aqueous nutrient medium containing at least one phosphate ion source and 6-azauracil or 6-azauridine as an additive substance to produce and accumulate 6-azauracil ribotide in the medium, and then recovering the 6-azauracil from the resultant culture liquor.

14 Claims, No Drawings

PROCESS FOR THE PREPARATION OF 6-AZAURACIL RIBOTIDE

CROSS-REFERENCE TO RELATED APPLICATION

This application is a Continuation-In-Part of copending application U.S. Ser. No. 737,375 filed on June 17, 1968, now abandoned which is a continuation application of U.S. Ser. No. 671,561 filed on Sept. 29, 1967, now abondoned.

This invention relates to a process for the preparation of 6-azauracil ribotide. More particularly, it relates to a process for the production of 6-azauracil ribotide by fermentation. Even more particularly, the invention relates to a process for the preparation of 6-azauracil ribotide inexpensively by a fermentation method using bacteria.

6-Azauracil ribotide has the following structure:

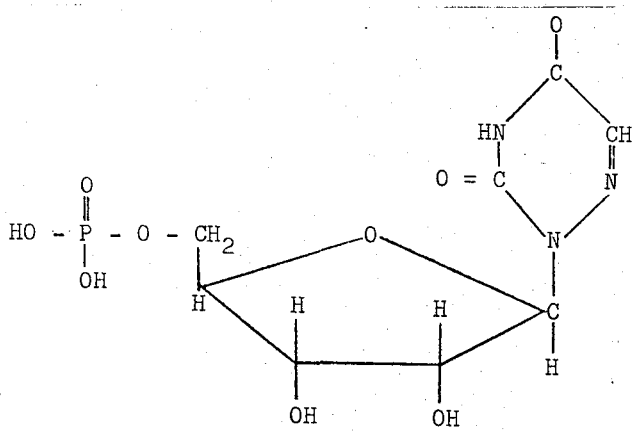

This compound is considered to be the active form of 6-azauracil or 6-azauridine, i.e., anti-cancer agents, shown when they actually act in the living body [W. Dorrel, *Proceedings of the Western Pharmacological Society*, Volume 4, pages 4 – 9 (1961)].

Up to the present, synthetic methods have been used for preparing 6-azauracil ribotide. However, such processes are not recognized as being good production processes from an industrial point of view because of the necessity of using expensive starting materials and the low unfavorable yields obtained therefrom. It is also known that 6-azauracil is changed to 6-azauracil ribotide by the living body. However, there is only a slight intra-cellular production thereof, and any extra-cellular production of the remarkable amounts obtained in the present invention has never been achieved.

Accordingly, one of the objects of the present invention is to provide an improved process for the preparation of 6-azauracil ribotide which overcomes the disadvantages and deficiencies of the prior art methods.

Another object of the present invention is to provide a process for producing 6-azauracil ribotide by fermentation which may be carried out in an efficacious and simple manner.

A further object of the invention is to provide a process for preparing 6-azauracil ribotide by fermentation which may be carried out advantageously on an industrial scale with inexpensive starting materials to give a high yield of product.

A still further object of the invention is to provide 6-azauracil ribotide.

These and other objects and advantages of the present invention will become apparent to those skilled in the art from a consideration of the following specification and claims.

The present inventors have attempted various studies on processes for producing nucleotides by using microorganisms and, as a result, have found that remarkable amounts of 6-azauracil ribotide are produced and accumulated in fermented solutions when the specific bacteria described hereinbelow are cultivated with the addition of 6-azauracil or 6-azauridine as well as at least one phosphate ion source to the culture medium at any time during culturing. This finding is a phenomenon which has been entirely unknown in the art up to the present invention.

Hence, in accordance with the present invention, it has been found that 6-azauracil ribotide may be prepared in large quantities by fermentation when 6-azauracil or 6-azauridine as well as at least one phosphate ion source is added to a culture medium in which the cultivation of bacteria belonging to a genus selected from the group consisting of Brevibacterium, Cornyebacterium, Arthrobacter and Micrococcus is carried out.

Either a synthetic culture medium or a natural nutrient medium is suitable in the present invention as long as it contains the essential nutrients for the growth of the strain employed. Such nutrients are well known in the art and include substances such as a carbon source, a nitrogen source, inorganic compounds and the like which are utilized by the microorganism employed in appropriate amounts. Thus, as a carbon source, there may be mentioned, by way of example, carbohydrates such as glucose, fructose, maltose, sucrose, starch, starch hydrolysate, molasses, etc., or any other suitable carbon source such as glycerol, mannitol, sorbitol, organic acids, etc. These substances may be used either singly or in mixtures of two or more. As a nitrogen source, various kinds of inorganic or organic salts or compounds, such as urea or ammonium salts such as ammonium chloride, ammonium sulfate, ammonium nitrate, ammonium phosphate, etc., or one or more than one amino acid mixed in combination, or natural substances containing nitrogen, such as cornsteep liquor, yeast extract, meat extract, peptone, fish meal, bouillon, casein hydrolysates, casamino acid, fish solubles, rice bran extract, etc. may be employed. Again, these substances may be used either singly or in combinations of two or more. Inorganic compounds which may be added to the culture medium include magnesium sulfate, iron sulfate or other iron salts, manganese chloride, calcium chloride, etc.

Furthermore, at least one phosphate ion source selected from the phosphate compounds such as sodium phosphate, sodium monohydrogen phosphate, sodium dihydrogen phosphate, potassium phosphate, potassium monohydrogen phosphate, potassium dihydrogen phosphate, ammonium phosphate, ammonium monohydrogen phosphate and ammonium dihydrogen phosphate should be added to the medium at a concentration of 0.3 to 3 percent as phosphate ion.

Also, if particular nutrients are required for the growth of the particular bacterium strain employed, these should be added to the medium. Such growth-promoters include amino acids, for example, aspartic acid, glutamic acid, threonine, methionine, etc., and/or vitamins, for example, biotin, thiamine, cobalamin, etc.

To such an aqueous nutrient medium, 6-azauracil or 6-azauridine is added all at one time or intermittently during the course of fermentation in the process of the present invention. Also, it is to be understood that suitable salts of 6-azauracil or 6-azauridine, such as the sulfate or the hydrochloride, can be added to the culture medium. The preferred amount of 6-azauracil or 6-azauridine or suitable derivative thereof to be added to the medium ranges from 0.5 to 5 g. per liter of fermentation medium.

The fermentation is carried out under aerobic conditions, such as aerobic shaking of the culture or with stirring of a submerged culture with aeration, at a temperature of about 20° to 40°C. and at a pH of about 4.0 to 9.5. The cultivation is generally continued for about 2 to 8 days, during which time remarkable amounts of 6-azauracil ribotide are produced and accumulated in the resultant fermentation liquor.

After the completion of fermentation, the 6-azauracil ribotide can be separated and recovered from the fermentation liquor by conventional means, such as ion exchange resin treatment, adsorption, precipitation, chromatography and the like.

The following examples are given merely as illustrative of the present invention and are not to be considered as limiting. Unless otherwise noted, the percentages therein and throughout the application are by weight per liter of water.

EXAMPLE 1

Brevibacterium ammoniagenes ATCC 6872 is used as the seed bacterium. It is cultivated at 30°C. for 24 hours in a culture medium having a composition consisting of 2 percent of glucose, 1 percent of peptone, 1 percent of yeast extract, 0.3 percent of NaCl and 30 µg/l of biotin. The resultant seed culture is transplanted in an amount of 10 percent by volume to a fermentation culture medium having the following composition:

100 g glucose 6 g urea 10 g $KH_2PO_4$ 10 g $K_2HPO_4$ 10 g $MgSO_4 \cdot 7H_2O$ 0.1 g $CaCl_2 \cdot 2H_2O$ 30 µg biotin 10 g yeast extract This fermentation medium is made up by dissolving the above components in water and diluting to 1 liter, adjusting the pH thereof to 8.0 with NaOH and sterilizing in an autoclave at 1 kg/cm$^2$ for ten minutes. The medium is then poured into individual flasks having a capacity of 250 ml., 20 ml. to each. After transplanting the seed culture as described above, fermentation is then carried out with aerobic shaking of the culture at 30°C.

After 72 hours of culturing, 6-azauracil is added to the culture solution in an amount such that its concentration in the fermented solution becomes 2 mg/ml. Culturing is continued for a further 24 hours, during which time 6-azauracil ribotide is produced and accumulated in the culture liquor. The 6-azauracil ribotide product is found to be accumulated in the resultant fermentation liquor in a concentration of 4.1 mg/ml. It is recovered by adsorption on a strongly basic polystyrene anion exchange resin, Dowex 1 (formic acid type), followed by elution with an aqueous solution of ammonium formate.

EXAMPLE 2

Culturing is carried out under the same conditions and in the same medium as described in Example 1, except that 6-azauridine is added to the medium instead of 6-azauracil. The amount of 6-azauracil ribotide produced in the culture liquor is 3.7 mg/ml.

EXAMPLE 3

Culturing is carried out similarly as described in Example 1, except that Corynebacterium sp. No. 3485 ATCC 21084 is used as the seed bacterium instead of Brevibacterium ammoniagenes. The amount of 6-azauracil ribotide produced in the resultant culture medium is 3.5 mg/ml.

EXAMPLE 4

Culturing is carried out under the same conditions and in the same manner as described in Example 1, except that Arthrobacter sp. No. 3486 ATCC 21085 is used as the seed bacterium instead of Brevibacterium ammoniagenes. The amount of 6-azauracil ribotide produced in the culture solution is 4.2 mg/ml.

EXAMPLE 5

Culturing is conducted in the same manner and in the same medium as described in Example 1, except that Micrococcus sodonensis ATCC 15932 is used as the seed bacterium instead of Brevibacterium ammoniagenes. The amount of 6-azauracil ribotide produced in the culture solution after the completion of fermentation is 2.3 mg/ml.

EXAMPLE 6

Culturing is carried out under the same conditions and in the same medium as described in Example 1, except that $K_2HPO_4$ and $KH_2PO_4$ are substituted by the phosphate compounds showed in Table 1 and 1 percent of $K_2SO_4$ is added to the medium.

The amounts of 6-azauracil ribotide produced in the culture liquor are described in Table 1.

Table 1

| Phosphate compounds | Concentration of compound added (g/l) | Amounts of 6-azauracil ribotide produced (mg/ml) |
| --- | --- | --- |
| $Na_2HPO_4$ | 10 | 4.0 |
| $+NaH_2PO_4$ | 10 | |
| $(NH_4)_2HPO_4$ | 10 | 3.5 |
| $+(NH_4)H_2PO_4$ | 10 | |
| $Na_3PO_4$ | 20 | 3.7 |
| $K_3PO_4$ | 20 | 3.8 |
| $(NH_4)_3PO_4$ | 20 | 3.3 |

This invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A process for the preparation of 6-azauracil ribotide by fermentation which comprises culturing a microorganism belonging to a genus selected from the group consisting of Brevibacterium, Corynebacterium, Arthrobacter and Micrococcus under aerobic conditions in an aqueous nutrient medium containing at least one phosphate ion source and as an additive substance a compound selected from the group consisting of 6-azauracil and 6-azauridine to produce and accumulate said 6-azauracil ribotide in said medium, and then recovering the 6-azauracil ribotide from the resultant culture liquor.

2. The process of claim 1, wherein said phosphate ion source is added to the medium in a concentration of 0.3 to 3 percent as a phosphate ion.

3. The process of claim 1, wherein said compound is added to the medium all at one time during the period of culturing.

4. The process of claim 1, wherein said compound is added to the medium intermittently during the period of culturing.

5. The process of claim 1, wherein said compound is added to the medium prior to the initiation of culturing.

6. The process of claim 1, wherein said compound is added to the medium in an amount of from 0.5 to 5 g. per liter of fermentation medium.

7. The process of claim 1, wherein culturing is carried out at a temperature of from about 20° to 40°C. and at a pH of about 4.0 to 9.5.

8. The process of claim 1, wherein said microorganism is *Brevibacterium ammoniagenes* ATCC 6872.

9. The process of claim 1, wherein said microorganism is Corynebacterium sp. No. 3485 ATCC 21084.

10. The process of claim 1, wherein said microorganism is Arthrobacter sp. No. 3486 ATCC 21085.

11. The process of claim 1, wherein said microorganism is *Micrococcus sodonensis* ATCC 15932.

12. A process for the preparation of 6-azauracil ribotide by fermentation which comprises culturing a microorganism selected from the group consisting of *Brevibacterium ammoniagenes* ATCC 6872, Corynebacterium sp. No. 3485 ATCC 21084, Arthrobacter sp. No. 3486 ATCC 21085, *Micrococcus sodonensis* ATCC 15932 under aerobic conditions in an aqueous nutrient medium containing at least one phosphate ion source and as an additive substance a compound selected from the group consisting of 6-azauracil and 6-azauridine at a temperature of from about 20° to 40°C. and at a pH of about 4.0 to 9.5 to produce and accumulate said 6-azauracil ribotide in said medium, and then recovering the 6-azauracil ribotide from the resultant culture liquor.

13. The process of claim 12, wherein said phosphate ion source is added to the medium during culturing in a concentration of 0.3 to 3 percent as a phosphate ion.

14. The process of claim 12, wherein said compound is added to the medium during culturing in an amount of from 0.5 to 5 g. per liter of fermentation medium.

* * * * *